(12) United States Patent
Wenneman et al.

(10) Patent No.: US 9,692,738 B1
(45) Date of Patent: Jun. 27, 2017

(54) RETURNS IN A MULTI-SELLER MARKETPLACE

(75) Inventors: Michael Christopher Wenneman, Seattle, WA (US); Joseph S. Trelin, Seattle, WA (US); Aaron D. Kujat, Issaquah, WA (US); Nicholas J. Morren, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 850 days.

(21) Appl. No.: 13/526,609

(22) Filed: Jun. 19, 2012

(51) Int. Cl.
*G06Q 30/06* (2012.01)
*H04L 29/06* (2006.01)
*G06Q 30/08* (2012.01)

(52) U.S. Cl.
CPC .................................. *H04L 63/08* (2013.01)

(58) Field of Classification Search
CPC .............................. G06Q 30/06; G06Q 30/08
USPC ................................................ 705/26.1, 27.1
See application file for complete search history.

(56) References Cited

U.S. PATENT DOCUMENTS

2002/0032612 A1* 3/2002 Williams ............... G06Q 10/08
705/26.1

\* cited by examiner

*Primary Examiner* — James Zurita
(74) *Attorney, Agent, or Firm* — Thomas Horstemeyer, LLP (57) ABSTRACT

Disclosed are various embodiments for facilitating item returns on behalf of customers of an electronic commerce site. Embodiments of the disclosure can, in one example, facilitate item returns on behalf of a buyer where the seller is a seller in a multi-seller marketplace. A return shipping label can be generated on behalf of the seller as well as communications between buyer and seller archived in the event of a subsequent dispute.

23 Claims, 8 Drawing Sheets

Shop.site returns center

User: John Doe

Select an order containing a product you would like to return  [ 33exf92ja ▽ ]

Order No.: 33exf92ja      Seller: Clothes Barn

Select items in order to return:

Performance Shirt
Paid: $89.99
Reason for return: [ ▽ ]
— 205a ☐

Comments:
[                    ]

Leather Pants
Paid $189.99
Reason for return: [ Improper fit ▽ ]
— 205b ☒

Comments:
[ They are too tight ]

( Submit )

201

Shop.site seller returns center

| | | |
|---|---|---|
| 33exf92ja | ! Approval Required | Buyer Communication Received |
| 5u93ybtw | ✓ Automatically Approved | Shipment Pending |
| oka4bato | ✓ Approved | Shipment Received |
| 56l752qt | ! Approval Required | Buyer Communication Received |
| p05gwf7v | ! Automatically Denied | View Details |
| 66e6afao | ✓ Approved | Shipment Received |
| g3rrwye5 | X Denied | View Details |

Shop.site returns center

User: John Doe

Order No.: 33exf92ja

Your have received a communication from the seller about your return request.

Returned Item:

Leather Pants
Paid $189.99
Reason for return:
[ Improper fit ▽ ]

Comments:
[ They are too tight ]

Thanks for your business! Would you like for us to ship you another size of the Leather Pants that might fit better? If not, you can go ahead and return them to us using the return shipping label and we'll credit your account!

( Reply )

RETURNS IN A MULTI-SELLER MARKETPLACE

BACKGROUND

In an electronic retail setting, multiple sellers may participate in a marketplace facilitated by an electronic commerce system. Customers may return products purchased via an electronic commerce site to the retailer from which they purchase products. The various sellers participating in the marketplace can have varying return policies and procedures, which can result in an inconsistent customer experience as well as inconsistent return policies.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
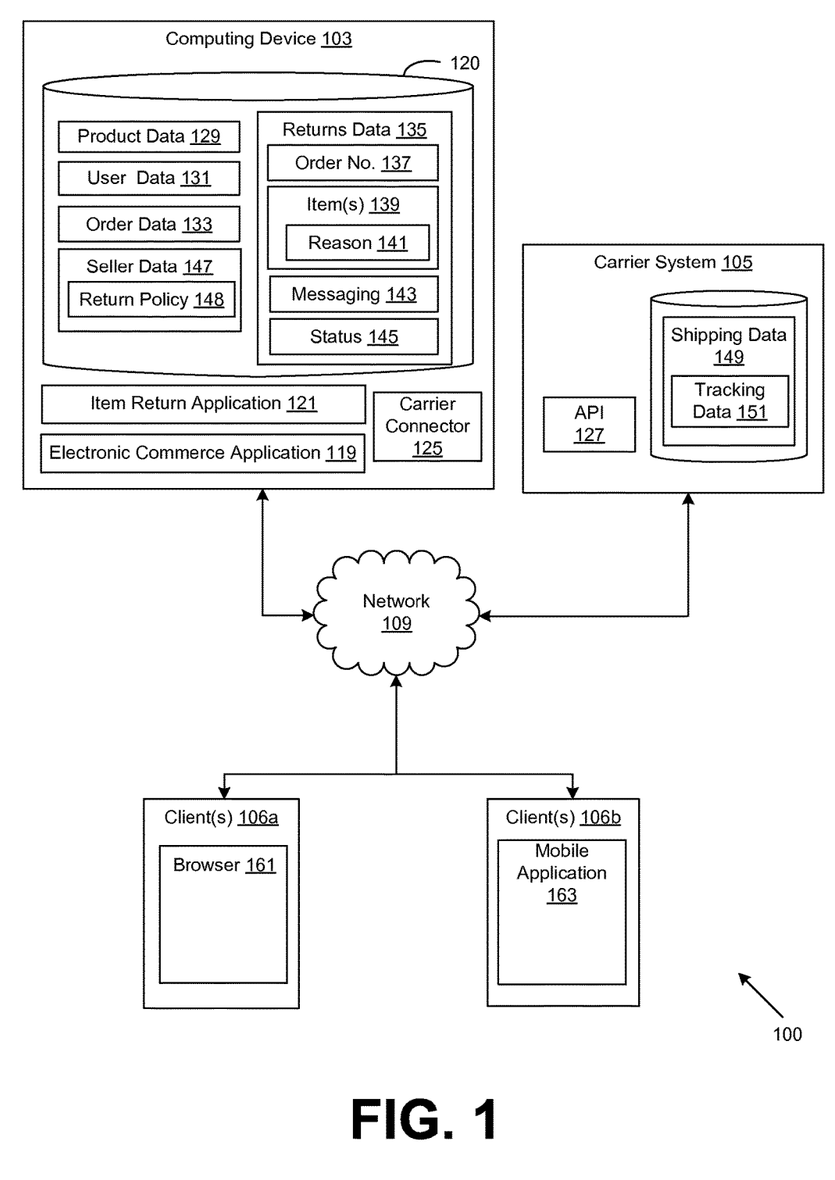
FIG. 1 is a drawing of a networked environment according to various embodiments of the present disclosure.

Users purchasing products via an electronic commerce site that facilitates a multi-seller marketplace may, from time to time, wish to a return and/or exchange of a product. In a multi-seller marketplace, the return experience can be inconsistent because the user may be required to interact with the various sellers through differing means of communication. Additionally, various sellers can impose differing return policies that can add to this inconsistency. Accordingly, embodiments of the present disclosure can optimize the return process in a multi-seller marketplace by providing a consistent item return experience regardless of the seller from which the returned item was purchased by the user. Embodiments of the disclosure can also With reference to FIG. 1, shown is a networked environment 100 according to various embodiments. The depicted networked environment 100 illustrates one example of an implementation of a system according to an embodiment of the disclosure. It should be appreciated that embodiments of the disclosure can be implemented in various ways. The networked environment 100 includes at least one computing device 103, a carrier system 105, and one or more clients 106 in communication over a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in the various arrangements as described above. Additionally, the carrier system 105 can also be implemented in one or more computing devices.

Various applications and/or other functionality may be executed in the computing device 103 according to various embodiments. Also, various data is stored in a data store 120 that is accessible to the computing device 103. The data store 120 may be representative of a plurality of data stores as can be appreciated. The data stored in the data store 120, for example, is associated with the operation of the various applications and/or functional entities described below.

The components executed on the computing device 103, for example, include an electronic commerce application 119, an item return application 121, carrier connector 125 and other applications, services, processes, systems, engines, or functionality not discussed in detail herein. The electronic commerce application 119 can facilitate an electronic commerce site associated with one or more retailers through which customers can purchase, rent, and/or download products. In some embodiments, the electronic commerce application 119 can facilitate an electronic commerce site that provides a marketplace in which multiple sellers can offer products to customers. Accordingly, an operator of the electronic commerce site may be different than and/or unaffiliated with a seller. To this end, the electronic commerce application 119 can process orders on behalf of customers and transmit network pages or other user interface elements that can be rendered on a client 106. Similarly, the electronic commerce application 119 can receive data from a client 106 pertaining to product selections, payment information, and other data necessary to effectuate an electronic commerce site. The specific functionality and various implementations of an electronic commerce site should be appreciated by a person of ordinary skill in the art, and is not discuss in detail herein.

The item return application 121 is executed to handle requests initiated by a buyer to return and/or exchange a product purchased from a seller via a multi-seller marketplace facilitated by the electronic commerce application 119. The item return application 121 can facilitate communications between a buyer and seller that are related to a request by a customer to return and/or exchange a product to the seller. The item return application 121 can also assist a seller with processing of requests from buyers to return products purchased from the seller.

The carrier connector 125 can facilitate communication with an application programming interface 127 provided by the carrier system 105. The carrier connector 125 can facilitate retrieval or tracking data associated with parcels that are in turn associated with customer orders processed by the electronic commerce application 119. In some embodiments, the carrier system 105 can push tracking data associated with parcels handled by a carrier to the carrier connector 125, which can provide the tracking data to subscribing systems and/or applications within an electronic commerce site. In one embodiment, tracking data associated with parcels can be generated whenever a product is scanned by a carrier device, and can be associated with a time, location, and other variables as can be appreciated.

In some embodiments, the functionality of the item return application 121, and/or carrier connector 125 may be included in the electronic commerce application 119. In other embodiments, the item return application 121 may be executed as a sub-module of the electronic commerce application 119, or as a separate, standalone application, etc. It should be understood that the depicted embodiment of an electronic commerce application 119, the item return application 121, and/or the carrier connector 125 is but one example. In other embodiments, customer returns to sellers can be initiated and processed by the item return application 121 without interacting with a carrier system 105. The depicted embodiment illustrating interactions with users of the carrier system 105 is merely one example.

Also, the computing device 103 can include at least one data store 120, which may comprise data and applications operable to provide access to the data stored therein. It should be appreciated that the data store 120 may or may not reside within a computing device 103, but may be accessible via a network to the computing device 103. The data store 120 can include product data 129, which can include various information about products available via an electronic commerce system facilitated by the computing device 103. The product data 129 can include information that can include, but is not limited to, product descriptions, product keywords, categories, stock keeping unit, product search terms, information identifying which sellers are offering the product for sale, and other information or meta data as can be appreciated.

The data store 120 can further include order data 133, which can include information about orders processed by the electronic commerce application 119. Order data 133 can include any information about an order that can facilitate the processing of a return and/or exchange by the item return application 121. In some embodiments, the order data 133 can identify the products in an order as well as the buyer and seller involved in the transaction. The order data 133 can also include an order number of other type of identifier with which an order can be uniquely identified within the data store 120.

The data store 120 can also include returns data 135 that includes various entries associated with requests initiated by a user or buyer to return a product purchased from a seller in an electronic marketplace facilitated by the electronic commerce application 119. Each record can include, for example, an order number 137 that identifies an order with which a return is associated. Returns data 135 further identifies one or more items 139 that are associated with a return request. In other words, the items 139 represent items or products that a user wishes to return to a seller as a part of a return request. The items 139 can identify products in a product catalog and/or product data 129 by a product identifier or other identifier that uniquely identifies a product within the data store 120. Each of the items 139 associated with a return request are also associated with a reason code 141 that identifies a reason the user is requested return of the item 139 to the seller.

Returns data 135 can also include messaging 143 between the buyer and seller regarding the return request, which can include any comments or requests provided by the user as well as any responses provided by a seller associated with the order number 137. The messaging 143 can include any other data or information exchanged by the buyer and seller pertaining to a return request. For example, the buyer and seller may contain images or other multimedia data that indicate a condition of an item.

The data store 120 also include seller data 147 that includes information about a seller such as seller account data, financial account information, a seller order history, seller contact information, return shipment addresses, and other information about a seller participating in a multi-seller marketplace facilitated by the electronic commerce application 119. Additionally, each seller can define one or more return policy 148 that specifies return rules and/or terms associated with the ability of users to initiate return requests. It should be appreciated that the depicted data store 120 and the table structure shown therein is but one example given for ease of depiction and explanation of various embodiments of this disclosure.

The carrier system 105 can include one or more computing devices from which shipment data about parcels can be received in the computing device 103. The carrier system 105 can include shipping data 149 that is related to parcels that can be associated with orders in an electronic commerce site. Shipping data 149 can include tracking data 151 related to various parcels that is maintained by a carrier. Tracking data 151 can include a tracking number as well as scan data that tracks each time a parcel is scanned by a carrier in transit to or from a customer as can be appreciated. The carrier system 105 can also provide an API 127 through which tracking data 151 can be retrieved by the carrier connector 125. In some embodiments, the carrier system 105 can push tracking data to the computing device 103 via an API provided therein. It should be appreciated that the carrier system 105 can be representative of multiple carrier systems 105 that may also be associated with various carriers, who may provide varying API's 127 or other ways to retrieve tracking data 151 related to parcels that are associated with customer orders. In other embodiments, a carrier system 105 and the carrier connector 125 can communicate via electronic data interchange messages or other methods to communicate tracking data 151 as can be appreciated.

The client 106 is representative of a plurality of client devices that may be coupled to the network 109. The client 106 may comprise, for example, a processor-based system such as a computer system and/or mobile device. Such computer system may be embodied in the form of a desktop computer, a laptop computer, a personal digital assistant, a cellular telephone, set-top box, music players, web pads, tablet computer systems, game consoles, or other devices with like capability. The client 106a may be configured to execute various applications such as a browser 161 and/or other applications. The browser 161 may be executed in a client 106a, for example, to access and render network pages, such as web pages, or other network content served up by the item return application 121, the electronic commerce application 119 and/or other systems. A client 106b can also be configured to execute a special purpose application, such as a mobile application 163, which may include client side code that renders a user interface that includes data provided by another system. For example, a buyer and/or seller can access content pages served up by the item return application and/or electronic commerce application 119 to interact with a returns center provided by the item return application 121 for the purposes initiating and/or processing return requests as discussed herein.

Next, a general description of the operation of the various components of the networked environment 100 is provided.

As referenced above, the item return application 121 can facilitate return of items or products purchased by a buyer from a seller in a multi-seller marketplace where the operator of the electronic commerce application 119 may be different and/or unrelated entity from the seller. Accordingly, the operator of the electronic commerce application 119 may wish to provide a consistent return experience to buyers who may wish to return items to sellers in such a multi-seller marketplace.

To begin, a seller may define a return policy 148 that sets the terms and/or conditions under which returns are accepted or approved by the seller. In one embodiment, an operator of the electronic commerce application 119 can specify that a return policy 148 of a seller must be at least as permissive as a baseline return policy. In other words, the operator can specify that a return policy 148 must be at least as generous as the baseline return policy with respect to a return window, refund terms, return shipping reimbursement, or other aspects of the baseline return policy. Additionally, the seller may define multiple return policies 148 that are associated with specific items and/or item categories of items offered for sale by the seller in the marketplace. For example, the seller may define a first return policy for a particular item or class of items that specifies that a request to return such an item is automatically approved by the item return application 121 if certain reason codes are associated with the return request. Additionally, the seller may define a second return policy for another item or class of items that specifies that the request to return such an item requires manual intervention or approval by a seller acting through a seller return user interface generated by the item return application 121 and provided to the seller. Continuing this example, the seller can also define a default return policy 148 that applies to any items or classes of items for which a specific return policy 148 has not been defined by the seller.

Therefore, in one embodiment, the item return application 121 can provide a user interface that allows a seller to identify items or classes of items as well as the various aspects and/or terms of a return policy 148. For example, the seller can specify particular items or classes of items associated with the return policy 148, whether the item return application 121 is empowered to automatically approve and/or deny a request to return an item covered by the return policy 148, whether an item covered by the return policy 148 requires manual intervention or approval by the seller, an acceptable amount of time following placing and/or shipment of an order in which a return is permitted, whether the seller and/or buyer is responsible for return shipping costs and in what cases either party bears such responsibility, whether the item return application 121 is empowered to issue a refund to a buyer on behalf of the seller, and other aspects of a return policy 148 that can be employed in an electronic marketplace.

When an item return involves a return shipment from buyer to an address specified by the return policy 148, the return policy 148 can also specifies which party, buyer or seller, is responsible for return shipment costs. The return policy 148 can also specify whether any return fees, restocking fees, damage fees, or any other fees should be charged to the buyer depending upon a reason code specified by the buyer in initiating a request to return the item and/or the condition of the item upon receipt by the seller. Accordingly, based upon the return policy 148, the item return application 121 can calculate an amount to be refunded to a buyer's account or payment instrument (e.g., credit card, gift card, etc.) as well as debited from a seller's account as a part of the return process.

Accordingly, the item return application 121 can generate a buyer return user interface in which a buyer can initiate a request to return an item associated with an order from a seller. As will be shown in the subsequent drawings, a buyer can select products associated with an order, specify a reason for a return request as well as initiating other types of communication with a seller for the purposes of a return. The item return application 121 can archive these communications in the event of a subsequent dispute regarding a return transaction between the buyer and seller.

The item return application 121 can also generate a seller return user interface that serves various purposes. First, one form of a seller return user interface allows a seller to view a dashboard user interface in which an overview of various return requests can be viewed. Additionally, another form of a seller return user interface allows a seller to view details of a particular return requests as well as potentially communicate with a buyer initiating a return request regarding the request.

Upon approval or denial of a return request by the item return application 121 and/or by manual intervention of a seller via a seller return user face, the item return application 121 can provide a return shipping label to the user. The return shipping label can be downloadable and/or printable and generated by the item return application 121 with a tracking number that is stored with the return data 135. Additionally, the item return application 121 can communicate with a carrier system 105 via the carrier connector 125 to obtain tracking data corresponding to the tracking number associated with the return and therefore update the status 145 of a return when the tracking data reflects that the shipment corresponding to the return shipping label has reached a destination provided by the seller.

Figure 2:
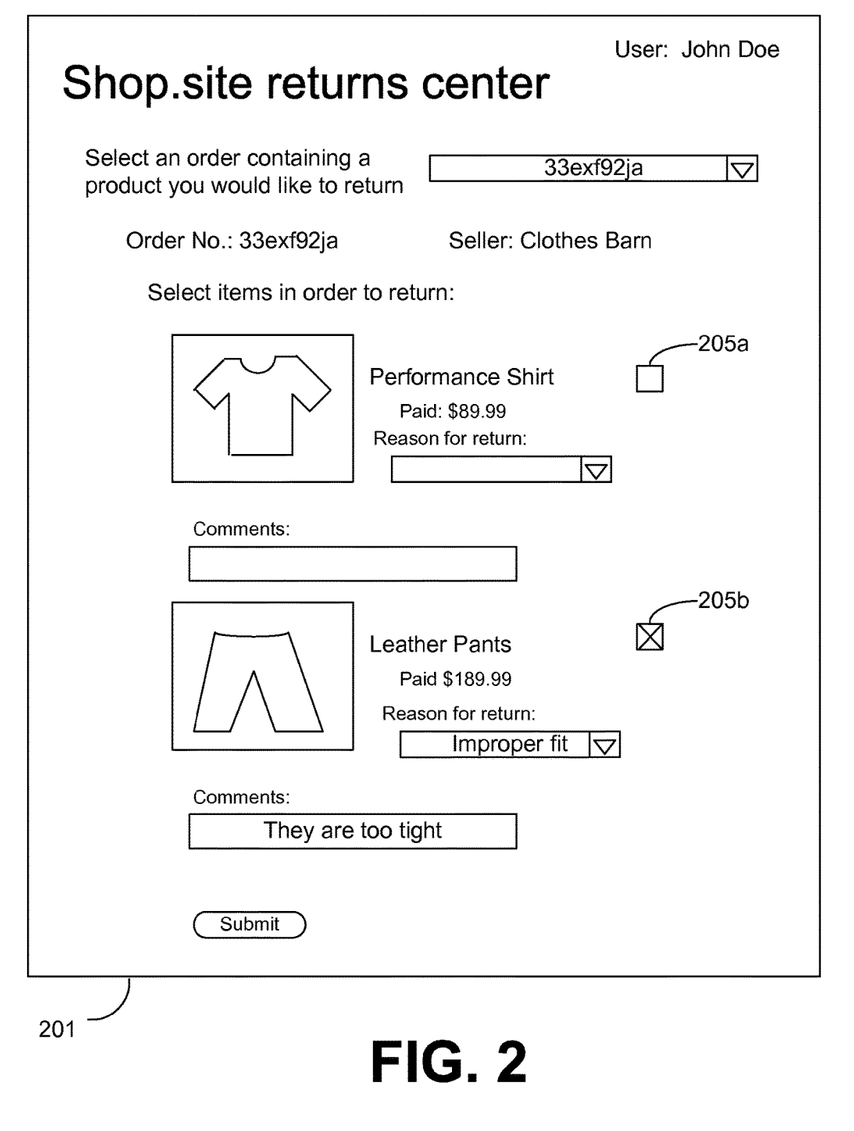
FIGS. 2-6 are example user interface generated by the item return application and rendered on a client device in the networked environment of FIG. 1.

Referring next to FIG. 2, shown is one example of a content page that can be rendered in a browser 161 executed by a client device 106*a*. The depicted content page represents an item return user interface 201 that can be presented to a buyer for the purpose of initiating a request to return a product purchased from a seller in a multi-seller marketplace facilitated by the electronic commerce application 119. In the depicted example item return user interface 201, the item return application 121 can present various options to a user. First, the item return user interface 201 can allow the user to select an order associated with one or more products the user wishes to return to the seller from which the user purchased the products in the order. A user can also select one or more of the items associated with the order that correspond to the items the user wishes to return by manipulating the checkboxes 205*a*, 205*b*.

Additionally, the user can select a reason associated with the user's desire to initiate a return request, which can be associated with a reason code that is transmitted to the item return application 121 and stored in the data store 120 upon submission of the form depicted in the example user interface. The user can also enter comments in the depicted comment field to provide additional information associated with the user's desire to initiate a return request. The reason code, comments provided in the comments field, products identified by the user, and other information associated with the return request that can be specified by the user are archived in the data store 120.

Upon submission of a return request by a user, the item return application 121 can generate a notification that is transmitted to the seller via email, short message service (SMS) message, a mobile application notification, provided in a notification user interface element in a seller dashboard user interface, or any other form of notification. In some embodiments, the item return application 121 can determine whether a seller return policy 148 as associated with an item and/or item category empowers the item return application 121 to automatically approve and/or deny a return request upon submission of the request. In this scenario, the item return application 121 may not notify the seller but may instead automatically approve or deny the request to return the item if the request meets or violates return terms specified by the return policy 148. For example, if the user requests return of an item outside of a return window specified by the return policy 148, then the item return application 121 can deny the return request on behalf of the seller. As another example, if the user requests return of a non-returnable item, the item return application 121 can similarly deny the return request on behalf of the seller. As another example, if the user requests return of an item for which the return policy 148 specifies automatic approval of the return request, the item return application 121 can issue a refund and/or a return shipping label on behalf of the seller.

As yet another example, the return policy 148 may specify that certain types of return transactions can be approved by the item return application 121 while others may not. For example, the return policy 148 may specify that the item return application 121 can automatically approve an exchange transaction behalf of a seller but that return transactions where the user is seeking a refund must be manually approved by the seller. As another example, the return policy 148 may also specify that transactions where certain items or item categories are requested to be exchanged with other certain items or item categories may be automatically approved by the item return application 121.

Figure 3:
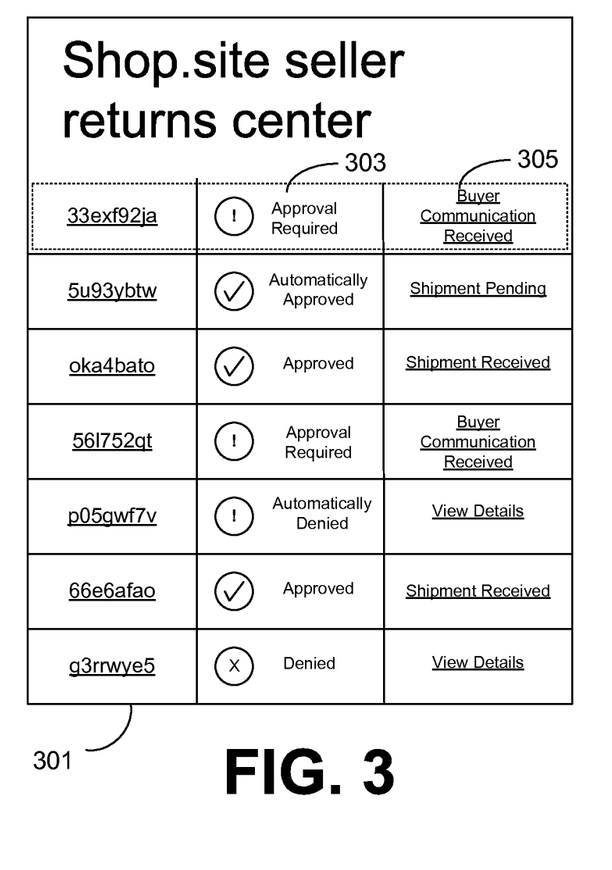

Reference is now made to FIG. 3, which illustrates one example of a seller return user interface 301. The depicted seller return user interface 301 can comprise a content page rendered in a browser 161 on a client 106a or in a special purpose application, such as a mobile application 163 that is executed on a client 106b. In the depicted example seller return user interface 301, the item return application 121 can populate the user interface with return requests associated with various orders of the seller that are in various stages of a return process. As shown in the example user interface, a return request can exist in many stages. When a return request is initiated by a buyer associated with an order and submitted to the item return application 121, the item return application 121 can generate a notification element 303 in the seller return user interface 301 to inform the seller that a return request has been initiated and that manual approval or denial of the return request is required as specified by the return policy 148 associated with the seller and/or items involved in the return request.

In the example of FIG. 3, the item return application 121 can also display a status indicator 305 associated with a return request. As shown in FIG. 3, the status indicator 305 can inform the seller of the status of a particular return request as well as provide additional information about the return request and/or a hyperlink through which a seller can view additional information about the return request. Additionally, as noted above, the item return application 121 can automatically approve and/or deny return requests based upon rules specified in a seller return policy 148.

The seller return policy 148 can also specify when manual intervention is required. Accordingly, the seller return user interface 301 can also notify a seller regarding when approval or denial or a return request is needed. Furthermore, as described above, the item return application 121 can communicate with a carrier system 105 to retrieve tracking data associated with shipment tracking numbers that correspond to return shipments so that a seller can, via the seller return user interface 301, obtain the status of return shipments associated with return requests.

Figure 4:
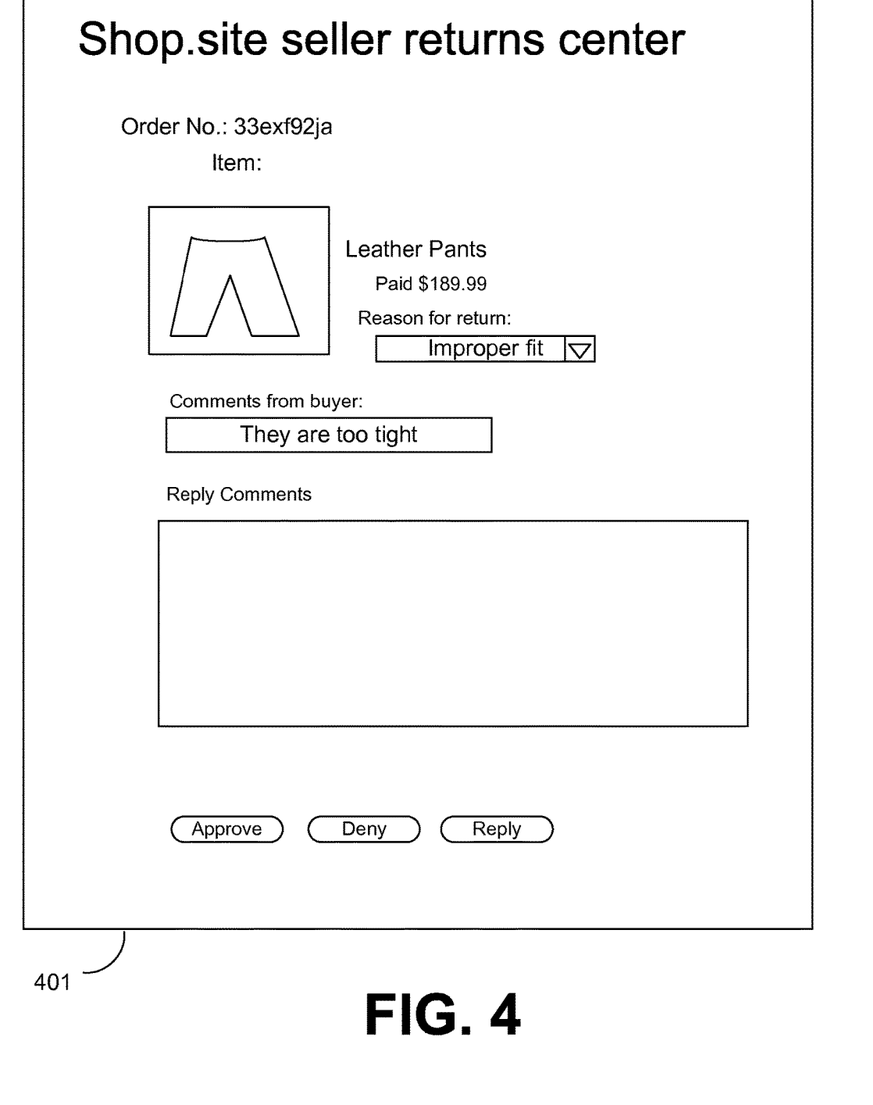

Referring now to FIG. 4, shown is an alternative example of a seller return user interface 401 in which a seller can view additional information about a return request as well as manually approve and/or deny the return request. The seller return user interface 401 also provides messaging capability so that the seller can communicate with the buyer in a way that is archived in the data store 120 in the event of a subsequent dispute.

Figure 5:
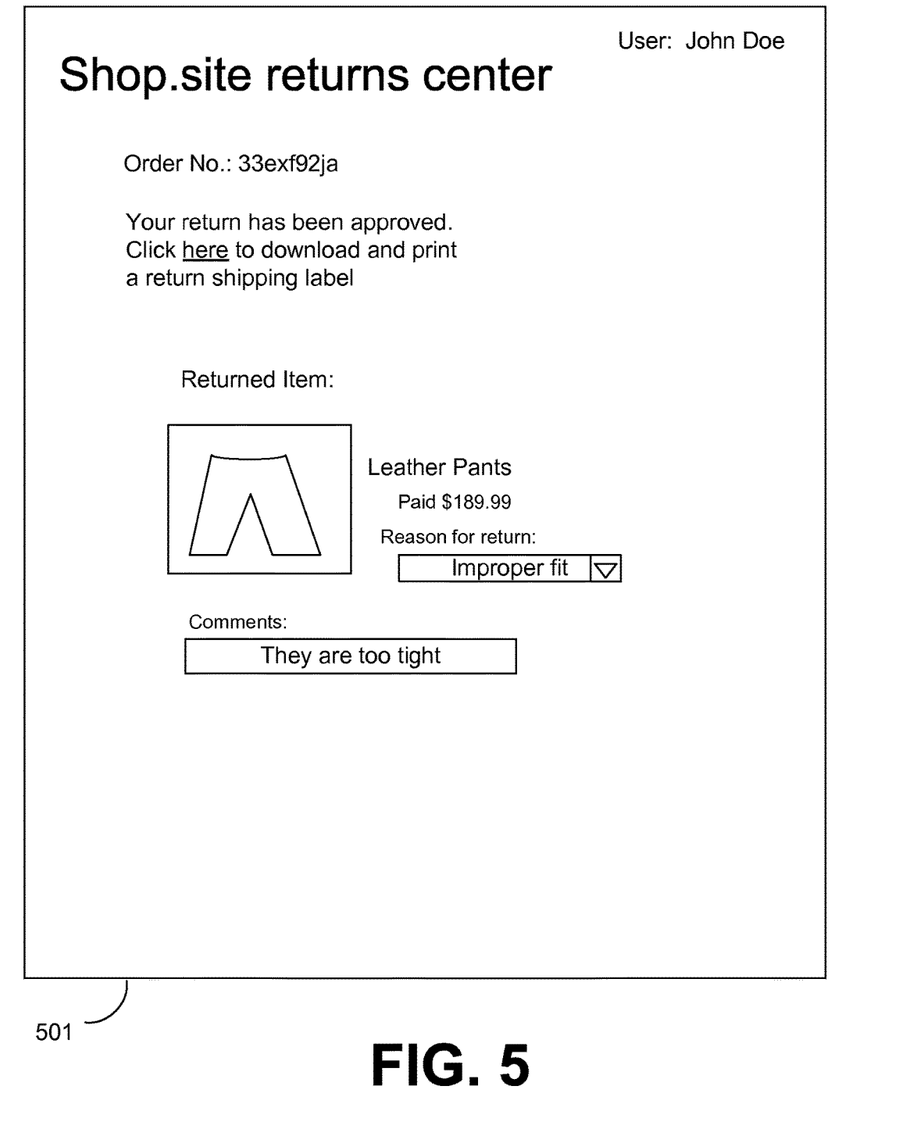

Continuing the example of FIG. 4, reference is now made to FIG. 5, which illustrates an alternative example of an item return user interface 501. In the example of FIG. 5, a seller has approved a return request initiated by a buyer. Accordingly, the item return application 121 can generate a return shipping label that can be downloaded and/or printed by the buyer and used to return the item to an address specified by the seller. A return address can be specified as a part of a seller defined return policy 148 and may vary on an item by item basis as well as by item category. The item return application 121 can also obtain a carrier tracking number that can be incorporated into the return shipping label so that the return shipment can be tracked by the item return application 121.

Figure 6:
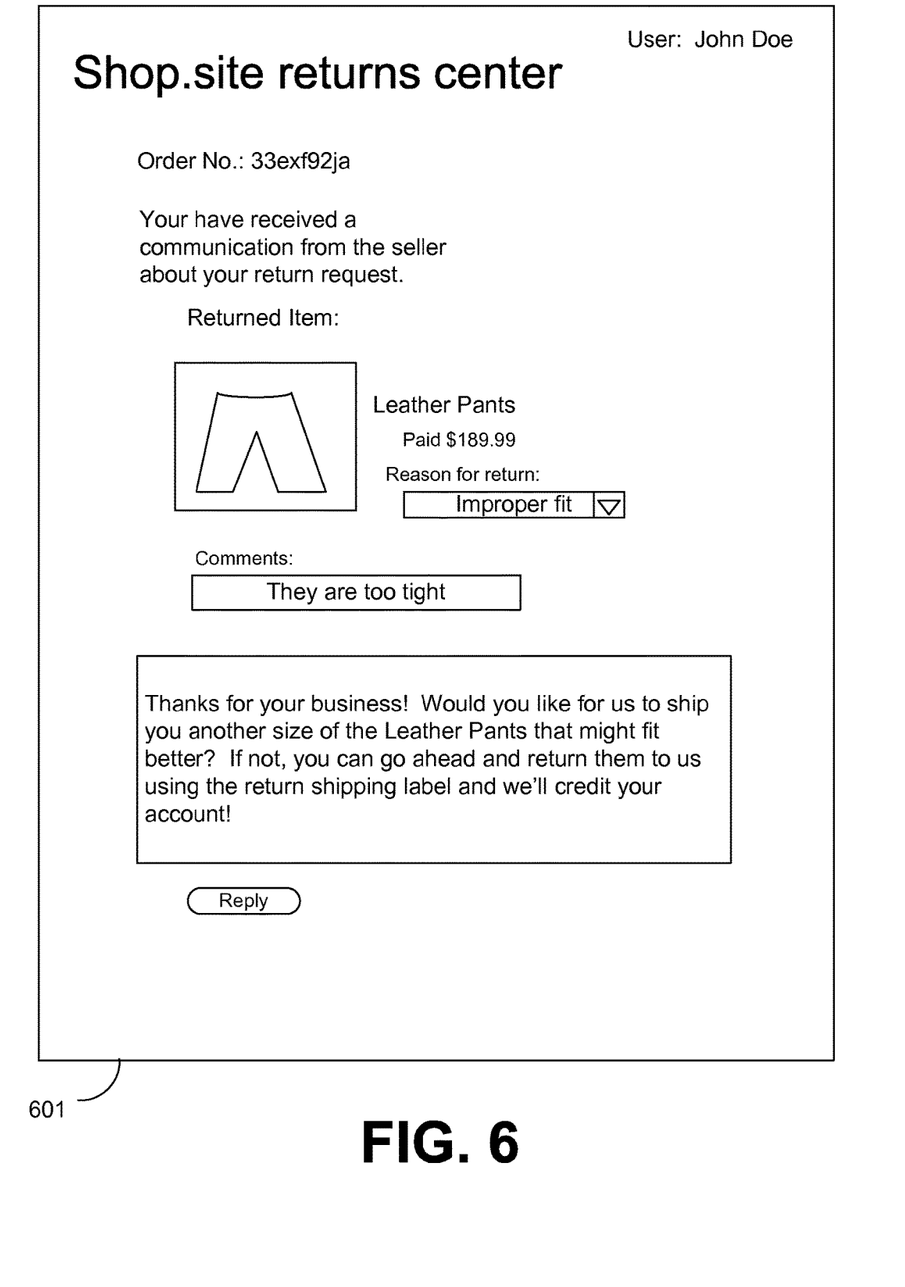

Similarly, referring to FIG. 6, shown is an alternative example of an item return user interface 601 in which the buyer is provided additional information about the return by the seller. The example of FIG. 6 illustrates a scenario in which a seller can approve a return request but still attempt to keep the sale or encourage the buyer to consider other products. Accordingly, the item return application 121 can, in some embodiments, complete or close a return request only when the return shipping label is printed and corresponding tracking information indicating that the return package has been received by the carrier.

Figure 7:
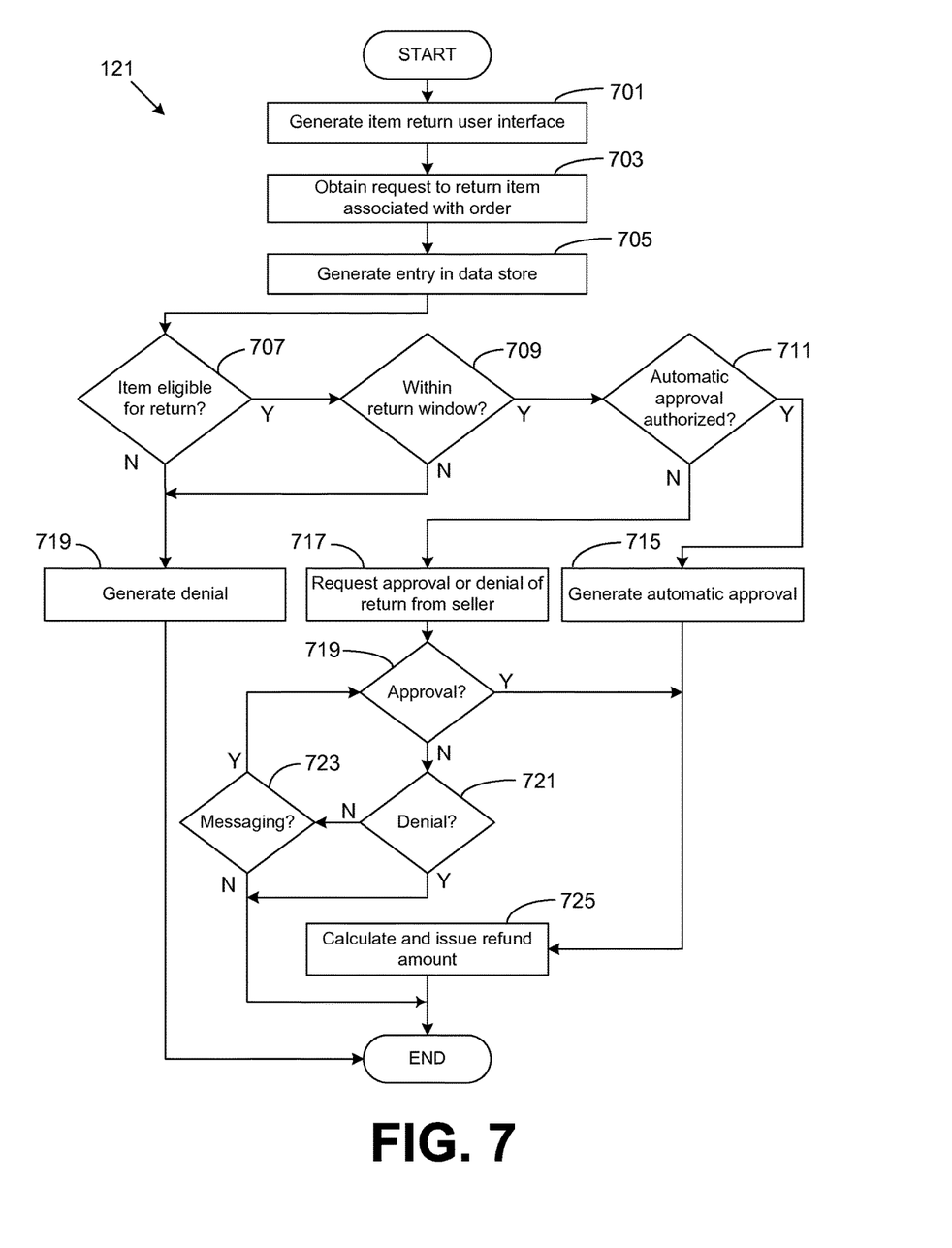
FIG. 7 is a flowchart illustrating one example of functionality implemented as portions of the item return application executed in a computing device in the networked environment of FIG. 1 according to various embodiments of the present disclosure.

Referring next to FIG. 7, shown is a flowchart that provides one example of the operation of a portion of the item return application 121 according to various embodiments. It is understood that the flowchart of FIG. 7 provides merely an example of the many different types of functional arrangements that may be employed to implement the operation of the portion of the item return application 121 as described herein. As an alternative, the flowchart of FIG. 7 may be viewed as depicting an example of steps of a method implemented in the computing device 103 (FIG. 1) according to one or more embodiments.

Beginning with box 701, the item return application 121 can generate an item return user interface for a buyer who may wish to initiate a return of a product or item purchased from a seller in a multi-seller marketplace. In box 703, the item return application 121 obtains a request to return at least one item associated with an order that was previously consummated between the buyer and the seller participating in the multi-seller marketplace. In box 705, the item return application 121 generates an entry in the data store 120 (FIG. 1) corresponding to a request to initiate a product return. As noted above, any messaging exchanged between buyer and seller via a return user interface can be archived in the data store 120 and associated with such an entry.

In box 707, the item return application 121 determines whether the item that is the subject of the return request is eligible for a return as specified by a seller return policy 148 defined by the seller. As noted above, a seller may specify a return policy 148 for certain items and/or item categories. Therefore, the seller return policy 148 may identify certain items and/or item categories as non-returnable. If such an item is the subject of a return request, then the item return application 121 can generate a return denial automatically. In box 709, the item return application 121 determines whether the return request is received within a return window specified by the seller. As noted above, the seller may define varying return windows for varying items and/or classes of items. Accordingly, if the return request associated with an item is received outside of a return window specified by a return policy 148, then in box 719 the item return application 121 generates a denial.

In box 711, the item return application 121 determines whether a return policy 148 defined by the seller authorizes automatic approval of a return of an item. If so, then in box 715 the item return application 121 generates an approval corresponding to the item return request and can transmit the approval to the buyer. Additionally, the item return application 121 can update a seller return user interface that displays information about various returns associated with a seller in the multi-seller marketplace. If the return policy 148 does not authorize an automatic approval of a return, then in box 717 the item return application 121 can request and obtain approval or denial of the return request from the seller. To request an approval or denial of the return request, the item return application 121 can generate a notification that is provided to the seller in a seller return user interface, an email message, a mobile application alert, or any of form of notification as can be appreciated.

In box 719, the item return application 121 can determine whether an approval associated with the return request has been obtained from the seller. In one embodiment, an approval can be obtained via a seller return user interface in which the seller or seller personnel can indicate approval via an approval button or other user interface element. If approval is not obtained, then in box 721, the item return application 121 determines whether the seller has denied the return request. As described above, the seller can deny a return request via a seller return user interface. In box 723, if the seller has neither approved nor denied the return request, the item return application 723 can facilitate messaging between the buyer and seller regarding the return request. For example, a seller may request additional information via a message which can be routed through the item return application 121 and archived in the data store 120. Additionally, any reply messaging from a buyer associated with a return request can also be archived in the data store 120. If messaging occurs between buyer and seller, the item return application 121 can again determine whether the seller eventually indicates approval or denial of the return request in boxes 719 and 721.

If the return request is approved in boxes 715 or 719, the item return application 121 can calculate and issue a refund amount by debiting a seller account and crediting a buyer account. The refund amount can be calculated based upon an amount paid by the buyer for the item and also by determining whether the seller return policy 148 applicable to the return request specifies any return charges, such as a restocking fee, return fee, return shipping fee, or any other fees or charges, should be applied against a refund amount to the buyer. In some embodiments, the seller return policy 148 can specify that the refund amount be credited to the buyer only after a return shipment associated with the return request is received, inspected, and approved by the seller. In one embodiment, the seller return policy 148 can specify that certain reason codes associated with a return request specify that a return fee to be charged against a refund amount payable to the buyer.

Figure 8:
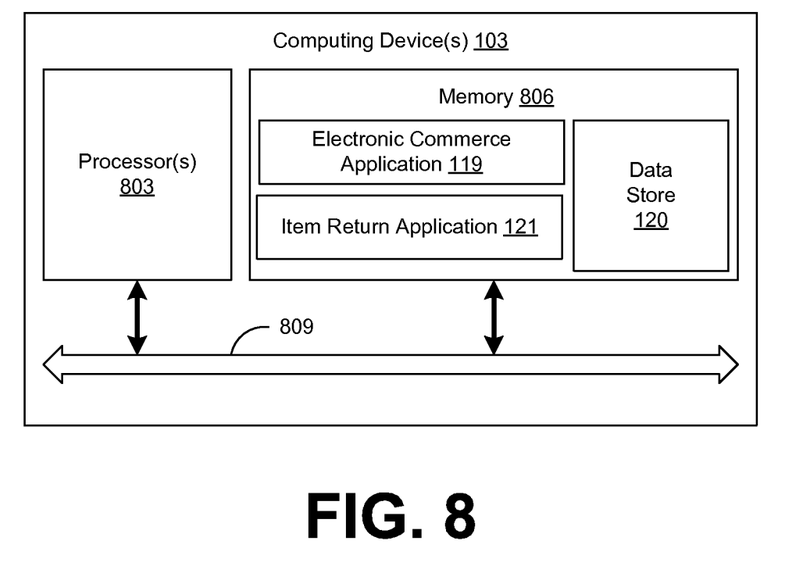
FIG. 8 is a schematic block diagram that provides one example illustration of a computing device employed in the networked environment of FIG. 1 according to various embodiments of the present disclosure.

With reference to FIG. 8, shown is a schematic block diagram of the computing device 103 according to an embodiment of the present disclosure. The computing device 103 includes at least one processor circuit, for example, having a processor 803 and a memory 806, both of which are coupled to a local interface 809. To this end, the computing device 103 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the electronic commerce application 119, the item return application 121, and potentially other applications. Also stored in the memory 806 may be a data store 120 and other data. In addition, an operating system may be stored in the memory 806 and executable by the processor 803.

It is understood that there may be other applications that are stored in the memory 806 and are executable by the processors 803 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and the memory 806 may represent multiple memories 806 that operate in parallel processing circuits, respectively. In such a case, the local interface 809 may be an appropriate network 109 (FIG. 1) that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the item return application 121 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 7 shows the functionality and operation of an implementation of portions of the item return application 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowchart of FIG. 7 shows a specific order of execution, it is understood that the order of execution may differ from that which is depicted. For example, the order of execution of two or more blocks may be scrambled relative to the order shown. Also, two or more blocks shown in succession in FIG. 2 may be executed concurrently or with partial concurrence. Further, in some embodiments, one or more of the blocks shown in FIG. 2 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including in the item return application 121, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, wherein when executed the program causes the computing device to at least:
    obtain a request associated with a user to return an item sold by a seller in a multi-seller electronic marketplace, the request associated with at least one item and at least one reason code;
    in response to obtaining the request, identify order data associated with the item, the order data comprising at least an identifier associated with the item and an identifier associated with the seller of the item;
    determine that a seller return policy associated with the seller that is stored in a data store specifies a return time window for the item that is at least as permissive as a return time window for the item that is specified in a baseline return policy stored in the data store by a comparison of the seller return policy to the baseline return policy;
    determine that the request is obtained within the return time window and that the item is a returnable item based at least in part upon the order data and the seller return policy associated with the seller;
    determine that the item is return eligible in response to determining that the request is obtained within the return time window and the item is a returnable item;
    determine whether the seller return policy authorizes automatic approval of the request when the item is return eligible, wherein automatic approval is approval that does not require manual approval;
    approve the request when the item is return eligible and the seller return policy authorizes automatic approval of the request;

generate a return mailing label associated with the request when the request is approved;

generate a notification for the seller when the seller return policy fails to authorize automatic approval of the request, the notification in a seller return user interface, the seller return user interface comprising a dashboard displaying a plurality of pending requests to return;

obtain one of an approval of the request or a denial of the request from the seller via the seller return user interface when the seller return policy fails to authorize automatic approval of the request; and calculate a refund amount associated with the request when the approval of the request is obtained, the refund amount calculated based at least in part upon the order data and the seller return policy.

2. A system, comprising:

at least one computing device; and an item return application executable in the at least one computing device, wherein when executed the item return application causes the at least one computing device to at least:

determine that a seller return policy associated with a seller complies with a baseline return policy of a multi-seller marketplace;

obtain a request associated with a user to return an item sold by the seller via an electronic commerce system facilitating the multi-seller marketplace;

identify order data associated with the item, the order data comprising at least an identifier associated with the item and an identifier associated with the seller of the item;

generate an item return user interface;

transmit the item return user interface to a client associated with the user;

determine that the request is obtained within a return time window based at least in part upon the order data and a seller return policy as specified by the seller;

in response to determining that the request is obtained within the return time window, determine whether the item is return eligible based at least in part upon the order data and the seller return policy;

initiate return of the item when the item is return eligible by generating a return entry in a data store; and obtain one of a return approval or a return denial from the seller when the item is return eligible based at least in part upon the order data and the seller return policy.

3. The system of claim 2, wherein when executed the item return application further causes the at least one computing device to at least calculate a refund amount associated with the request when the return approval is obtained, the refund amount calculated based at least in part upon the order data and the seller return policy.

4. The system of claim 2, wherein the item return user interface further comprises a user messaging element, the user messaging element comprising a form configured to transmit a user message to the seller, and the item return application further comprises logic that archives the user message in the data store.

5. The system of claim 2, wherein obtaining one of the return approval or the return denial further comprises generating a notification that is transmitted to the seller to obtain one of the return approval or the return denial.

6. The system of claim 5, wherein generating the notification that is transmitted to the seller to obtain one of the return approval or the return denial further comprises generating a seller return user interface, the seller return user interface comprising at least one pending return associated with a seller account of the seller, wherein the request associated with the user to return the item is one of the at least one pending returns.

7. The system of claim 6, wherein the seller return user interface further comprises a seller messaging element, the seller messaging element comprising a form configured to transmit a seller message to the user, and the item return application further causes the at least one computing device to at least archive the seller message in the data store.

8. The system of claim 6, wherein the request to return the item comprises at least one of a reason code or a comments field, the seller return user interface further comprises a return decision user interface element allowing the seller to indicate one of the return approval or the return denial, the return decision user interface element comprising the at least one of the reason code or the comments field.

9. The system of claim 2, wherein when executed the item return application further causes the at least one computing device to at least generate a return shipping label when the item is return eligible and the return approval is obtained.

10. The system of claim 9, wherein generating the return shipping label further comprises:

generating a carrier tracking number;

associating the carrier tracking number with the request associated with the user to return the item; and incorporating the carrier tracking number into the return shipping label.

11. The system of claim 9, wherein when executed the item return application further causes the at least one computing device to at least:

obtain tracking data from a carrier system, the tracking data corresponding to the carrier tracking number; and generate a user interface reflecting a parcel return notification when the tracking data reflects that a parcel corresponding to the carrier has been returned.

12. The system of claim 2, wherein obtaining one of the return approval or the return denial further comprises:

determining whether the seller return policy specifies that automatic approval of the request to return the item is authorized, wherein automatic approval is approval that does not require manual approval of the seller; and generating the return approval on behalf of the seller.

13. The system of claim 12, wherein determining whether the seller return policy specifies that automatic approval of the request to return the item is authorized further comprises determining whether the item is associated with at least one item category that the seller return policy specifies that automatic approval of a return associated with the item category is authorized.

14. The system of claim 2, wherein obtaining one of the return approval or the return denial further comprises:

determining whether the seller return policy specifies that the request to return the item is denied; and generating the return denial on behalf of the seller.

15. A method, comprising:

providing an item return application executable in at least one computing device;

determining, by the item return application executed in the at least one computing device, that a seller return policy associated with a seller complies with a baseline return policy of a multi-seller marketplace;

obtaining, by the item return application executed in the at least one computing device, a request associated with a user to return an item purchased from the seller via an electronic commerce system facilitating the multi-seller marketplace;

in response to obtaining the request, identifying, by the item return application executed in the at least one computing device, order data associated with the item and a seller return policy associated with the seller, the order data comprising at least an identifier associated with the item and an identifier associated with the seller of the item;

generating, by the item return application executed in the at least one computing device, an item return user interface;

determining, by the item return application executed in the at least one computing device, that the request is obtained within a return time window specified by the seller return policy, based at least in part upon the order data and the seller return policy;

in response to determining that the request is obtained within the return time window specified by the seller return policy, determining, by the item return application executed in the at least one computing device, that the item is return eligible based at least in part upon the order data and the seller return policy; and determining, by the item return application executed in the at least one computing device, one of a return approval or a return denial based at least in part upon the order data and the seller return policy; and obtaining, by the item return application executed in the at least one computing device, one of the return approval or the return denial from the seller when the return denial is determined based at least in part upon the order data and the seller return policy.

16. The method of claim 15, further comprising:
calculating, by the item return application executed in the at least one computing device, a refund amount associated with the request when the return approval is obtained, the refund amount calculated based at least in part upon the order data and the seller return policy;

crediting, by the item return application executed in the at least one computing device, a buyer account with the refund amount; and debiting, by the item return application executed in the at least one computing device, a seller account by the refund amount.

17. The method of claim 15, further comprising generating, by the item return application executed in the at least one computing device, a seller notification associated with the request, the seller notification informing the seller of the request.

18. The method of claim 17, wherein generating the seller notification further comprises generating, by the item return application executed in the at least one computing device, a seller return user interface comprising a plurality of requests to return items purchased via the electronic commerce system.

19. The method of claim 18, wherein the seller return user interface further comprises an approval user interface element configured to obtain the return approval or the return denial.

20. The method of claim 15, wherein determining the one of the return approval or the return denial further comprises:
identifying, by the item return application executed in the at least one computing device, whether the seller return policy permits automatic approval of a return request associated with the item, wherein automatic approval is approval that does not require manual approval of the seller; and generating, by the item return application executed in the at least one computing device, the return approval when the seller return policy permits automatic approval of the return request.

21. The method of claim 15, further comprising:
generating, by the item return application executed in the at least one computing device, a return shipping label associated with the request when the return approval is determined or obtained; and transmitting, by the item return application, the return shipping label from the at least one computing device to a client associated with a buyer.

22. The method of claim 21, further comprising:
generating, by the item return application executed in the at least one computing device, a carrier tracking number associated with the return shipping label;

obtaining, by the item return application executed in the at least one computing device, from at least one carrier system, package tracking information corresponding to the carrier tracking number; and updating, by the item return application executed in the at least one computing device, a seller return user interface with the package tracking information associated with the request.

23. The method of claim 15, further comprising:
providing a carrier connector application executable in the at least one computing device;

obtaining, by the carrier connector application executed in the at least one computing device, tracking data pushed to the carrier connector application via an application programming interface provided by a carrier system, the tracking data associated with a parcel comprising the item; and generate, by the carrier connector application executed in the at least one computing device, a parcel return notification when the tracking data is obtained via the application programming interface.

* * * * *